(12) United States Patent
Lamm et al.

(10) Patent No.: US 11,054,019 B2
(45) Date of Patent: Jul. 6, 2021

(54) OIL CONTAINER FOR COOLING AND/OR LUBRICATING BEARINGS OF A DRIVE TRAIN OF A VEHICLE, IN PARTICULAR OF A MOTOR VEHICLE

(71) Applicant: VOLKSWAGEN AKTIENGESELLSCHAFT, Wolfsburg (DE)

(72) Inventors: Eugen Lamm, Wolfsburg (DE); Bjoern Becker, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/784,546

(22) Filed: Feb. 7, 2020

(65) Prior Publication Data
US 2020/0256455 A1    Aug. 13, 2020

(30) Foreign Application Priority Data
Feb. 7, 2019  (DE) .............................. 102019201586

(51) Int. Cl.
| F16H 57/04 | (2010.01) |
| F16H 37/04 | (2006.01) |
| F16H 57/037 | (2012.01) |
| F16H 57/02 | (2012.01) |

(52) U.S. Cl.
CPC ....... *F16H 57/0452* (2013.01); *F16H 37/042* (2013.01); *F16H 57/037* (2013.01); *F16H 57/0423* (2013.01); *F16H 57/0457* (2013.01); *F16H 57/0471* (2013.01); *F16H 57/0483* (2013.01); *F16H 2057/02052* (2013.01)

(58) Field of Classification Search
None
See application file for complete search history.

(56) References Cited

U.S. PATENT DOCUMENTS

| 8,267,223 | B2 * | 9/2012 | Ideshio | ............... F16H 57/0447 |
| | | | | 184/6 |
| 9,772,027 | B2 * | 9/2017 | Preston | ............... F16H 57/0409 |
| 9,856,971 | B2 * | 1/2018 | Mikami | ............. F16H 57/0471 |

(Continued)

FOREIGN PATENT DOCUMENTS

| DE | 102015013973 A1 | 5/2016 |
| EP | 1907729 A1 | 4/2008 |

(Continued)

*Primary Examiner* — Dirk Wright
(74) *Attorney, Agent, or Firm* — Laurence A. Greenberg; Werner H. Stemer; Ralph E. Locher

(57) ABSTRACT

An oil container for cooling and/or lubricating bearings of a drive train of a vehicle. The drive train has a driveshaft, a gear mechanism, a differential and a wheel driveshaft. The differential has a final drive gearwheel in engagement with a gearwheel of the gear mechanism and they splash at least partially in an oil sump region. The gearwheels of the gear mechanism and/or the final drive gearwheel form at least two gear stages. The structural complexity of a drive train is reduced or the efficiency of a drive train is increased when the oil container is functionally configured and/or arranged such that the oil container is arranged in the region between the two gear stages and substantially on the side of the driveshaft and/or the wheel driveshaft lying opposite the oil sump region.

15 Claims, 7 Drawing Sheets

(56) References Cited

U.S. PATENT DOCUMENTS

| | | |
|---|---|---|
| 10,378,641 B2 * | 8/2019 | Nakano .................... B60K 1/00 |
| 10,746,282 B2 * | 8/2020 | Ito ........................ F16H 57/0457 |
| 2008/0128208 A1 | 6/2008 | Ideshio et al. |
| 2009/0127954 A1 | 5/2009 | Mogi |
| 2016/0123455 A1 | 5/2016 | Mikami et al. |
| 2018/0172138 A1 | 6/2018 | Nakano et al. |
| 2019/0170243 A1 * | 6/2019 | Brizendine ......... F16H 57/0434 |
| 2020/0254871 A1 * | 8/2020 | Lamm ................. F16H 57/0471 |

FOREIGN PATENT DOCUMENTS

| | | |
|---|---|---|
| JP | 2018087615 A | 6/2018 |
| WO | 2007013642 A1 | 2/2007 |

\* cited by examiner

OIL CONTAINER FOR COOLING AND/OR LUBRICATING BEARINGS OF A DRIVE TRAIN OF A VEHICLE, IN PARTICULAR OF A MOTOR VEHICLE

CROSS-REFERENCE TO RELATED APPLICATION

This application claims the priority, under 35 U.S.C. § 119, of German patent application DE 10 2019 201 586, filed Feb. 7, 2019; the prior application is herewith incorporated by reference in its entirety.

BACKGROUND OF THE INVENTION

Field of the Invention

The invention pertains to an oil container for cooling and/or lubricating bearings of a drive train of a vehicle, in particular of a motor vehicle. The drive train has at least one driveshaft, at least one gear mechanism, at least one differential and at least one wheel driveshaft. The differential has at least one final drive gearwheel and the final drive gearwheel is in engagement with at least one gearwheel of the gear mechanism. The final drive gearwheel and/or a gearwheel of the gear mechanism is arranged splashing at least partially in an oil sump region. The gearwheels of the gear mechanism and/or the final drive gearwheel form at least two gear stages, and two gearwheels of the gear mechanism are arranged on an intermediate shaft. At least one wheel driveshaft is arranged coaxially to the driveshaft, and the intermediate shaft of the gear mechanism is arranged substantially on the side of the driveshaft and/or the wheel driveshaft lying opposite the oil sump region, In the prior art, a plurality of drive trains for motor vehicles are known. These firstly have a driveshaft, a gear mechanism, a differential and at least one wheel driveshaft. Here, the drive torque or the force flow runs from the drive motor (this may be an internal combustion engine or also an electric motor), via a driveshaft, and in some cases via a clutch or gear mechanism, to the at least one wheel driveshaft. In many drive trains, a differential is actively arranged functionally between the gear mechanism and the wheel driveshaft. The differential generally comprises a final drive gearwheel. The final drive gearwheel is in engagement with at least one gearwheel of the gear mechanism. In general, an oil sump region is provided in the lower region of the housing or housing part surrounding the differential and/or the drive motor, wherein the final drive gearwheel is arranged splashing in the oil sump region.

The invention builds on the prior art reference US 2009/0127954 A1, where the drive train for a vehicle, in particular a motor vehicle, is substantially formed as a coaxial drive train. The drive motor is configured as an electrical machine, in particular an electric motor, wherein corresponding housing parts or housing regions are provided which surround partially the drive motor, partially the gear mechanism and/or partially the differential. The gearwheels of the gear mechanism and/or the final drive gearwheel form at least two gear stages, wherein two gearwheels of the gear mechanism are arranged on an intermediate shaft. Two wheel driveshafts are provided or present, wherein at least one wheel driveshaft is arranged coaxially to the driveshaft, in particular extends through the driveshaft which is configured as a hollow shaft. The intermediate shaft of the gear mechanism and the gearwheels arranged in particular on the intermediate shaft are arranged substantially on the side of the driveshaft and/or the wheel driveshaft opposite the oil sump region. In other words, the intermediate shaft with the gearwheels is mounted above the driveshaft and above the wheel driveshafts, and the oil sump region is formed or provided in the lower region of the housing or respective housing parts. Or in yet other terms, in relation to the vertical axis of the vehicle, the oil sump region is mounted or arranged below the driveshaft and/or below the wheel driveshafts, and the intermediate shaft is mounted or arranged above the driveshaft or above the wheel driveshafts.

In the drive train known from the prior art, an oil pump is provided to supply oil to the bearings and/or other components of the drive train in the region of the oil sump. The oil pump pumps oil into corresponding flow channels which then lead to specific bearings of the driveshaft, wheel driveshafts, gear mechanism and/or certain components of the electric motor, in order to lubricate and/or cool the corresponding components. The oil pump is necessary in particular because coaxial drive trains usually have bearings, gearwheels and/or components which must be lubricated and/or cooled with oil but which do not have direct contact with the relatively wide oil sump region, such as for example a final drive gearwheel arranged splashing in the oil sump region. With a corresponding arrangement, the latter in particular however also leads to increased splash losses and reduces the efficiency of the gear mechanism drive train. An oil pump, in particular configured electrically, must also be driven accordingly and therefore requires an associated energy consumption.

The drive trains known from the prior art, and/or the former oil containers, are therefore not designed optimally. Firstly, separate oil pumps are required to convey the oil, which reduces the efficiency of a drive train and increases the structural complexity and associated costs. Furthermore, previously in the prior art, attempts have been made to lubricate and/or cool accordingly the gearwheels arranged on the intermediate shaft of the gear mechanism by a correspondingly structurally designed housing, which then forms a second further oil sump in the upper housing region. The latter is firstly structurally complex and cost-intensive, and secondly requires more installation space.

BRIEF SUMMARY OF THE INVENTION

It is accordingly an object of the invention to provide a oil container for a vehicle which overcomes the above-mentioned and other disadvantages of the heretofore-known devices and methods of this general type and which provides for a refined oil container and/or a drive train such that firstly the efficiency of a drive train is improved, and secondly the structural complexity and cost for forming the oil sump regions and/or flow channels are reduced.

With the above and other objects in view there is provided, in accordance with the invention, an oil container for cooling and/or lubricating bearings of a drive train of a vehicle, the drive train having a driveshaft, a gear mechanism, a differential, and at least one wheel driveshaft, the differential having a final drive gearwheel and the final drive gearwheel meshing in engagement with at least one gearwheel of the gear mechanism;

an oil sump region configured for the final drive gearwheel and/or a gearwheel of the gear mechanism to splash at least partially in the oil sump region;

the gearwheels of the gear mechanism and/or the final drive gearwheel forming at least two gear stages, and two gearwheels of the gear mechanism being arranged on an intermediate shaft, and at least one wheel driveshaft being disposed coaxially to the driveshaft, and wherein the intermediate shaft of the gear mechanism is arranged substantially on a side of the driveshaft and/or a wheel driveshaft opposite the oil sump region; and the oil container being configured in a region between the two gear stages and substantially on a side of the driveshaft and/or wheel driveshaft lying opposite the oil sump region.

Firstly, an oil container is provided and/or present which is functionally configured and/or arranged such that the oil container is arranged in the region between the two gear stages and substantially on the side of the driveshaft and/or wheel driveshaft lying opposite the oil sump region. By forming such an oil container and arranging it position-specifically or according to its purpose, decisive advantages are achieved which will be explained in more detail in particular below. Substantially, no separate electrically driven oil pump is now required. The structural complexity, which was previously necessary in the prior art in order to form a second oil sump in the upper region of the housing for example, is no longer required. Thus the structural complexity and costs are reduced and the efficiency of the gear mechanism and drive train increased.

In particular, the longitudinal axis of the oil container extends substantially parallel to the planes determined by the respective diameters of the gearwheels. In particular, the oil container or its formation/dimensioning extends substantially over the entire width of the housing, wherein the oil container is configured and/or arranged substantially between the two gear stages. Thus quasi-functionally, not only is a "second oil sump region" formed in the upper region of the housing to supply the gearwheels arranged on the intermediate shaft, but it is also possible for the oil to be transported further into other regions of the housing and hence to various specific bearings or specific regions of the gear mechanism, which will be explained in more detail below.

Firstly, the oil container has at least one interior which can be filled with oil and at least one oil inlet region. The oil inlet region is positioned and/or configured such that oil can be transported from the oil sump region into the oil inlet region by the rotating final drive gearwheel. Here, the oil inlet region in particular has an oil inlet window and a curved oil catchment region, wherein the latter is at least partially adapted in particular to the contour of the rotating final drive gearwheel. Via the final drive gearwheel, which rotates accordingly in the drive train during operation, in particular on corresponding forward motion of the motor vehicle, oil can be conveyed from the oil sump region into the interior of the oil container, in particular without the need to provide a separate electrically driven pump.

The oil container has at least one first oil outlet region, wherein the first oil outlet region is positioned and/or configured such that firstly oil can be extracted from the interior of the oil container and supplied for onward transport to a gearwheel arranged on the intermediate shaft. For this, the first oil outlet region in particular has an oil outlet window and a partially curved and/or ramp-like oil guidance region. In particular, via the first oil outlet region, the corresponding gearwheel arranged on the intermediate shaft may be lubricated and/or cooled, in particular also in addition oil can be transported on to other points of the drive train, in particular to different bearings and/or further flow channels, as will be explained in more detail below.

In particular, the oil container has several oil outlet regions, by means of which different bearings of the drive train and/or several flow channels leading to different bearings can be supplied with oil. Due to the correspondingly formed oil container, the flexibility of oil lubrication/oil supply of the drive train can thus be increased in a structurally simple fashion.

Thus the driveshaft of the drive train is mounted by means of a first and a second bearing which are axially spaced from each other, wherein the oil container has a second and a third oil outlet region for supplying these bearings. The second and the third oil outlet region are in particular provided or formed on one and the same side of the oil container, in particular on the "motor side" of the oil container.

An end plate, or end shield, for mounting the differential is arranged between the differential or the final drive gearwheel of the differential and a housing part receiving a drive motor. In particular, the end shield has a flattened region in its upper region, i.e. on the side facing away from the oil sump region, on which the oil container can be arranged in a structurally simple fashion, in particular by push-fit connections. This guarantees simple and economic mounting.

Finally, the oil container has a fourth oil outlet region, by means of which a third bearing arranged in a bearing receptacle of the end shield can be supplied with oil. In particular, the fourth oil outlet region has an oil outlet opening which is fluidically connected to a supply region, in particular formed partially in a ramp-shape, of the end shield. The supply region of the end shield is in particular configured as an integral part of the end shield, and guides or conducts the oil to the third bearing arranged in the bearing receptacle of the end shield. Because of the arrangement of the oil container on the end shield, and the previously outlined design, no further, also separately driven, oil pump is required for this.

Housing parts or corresponding housing regions of the drive train have flow channels for supplying the first and second bearings, which can be supplied with oil by means of the second and third oil outlet regions.

The first, second and third oil outlet regions are arranged and/or formed on the same side of the oil container, in particular on the motor side of the oil container. The oil inlet region is in particular arranged and/or formed on the opposite side of the oil container, in particular on the side of the oil container facing away from the motor. In contrast, the fourth oil outlet region is formed on the underside of the oil container. Substantially, all oil inlet and/or outlet regions are fluidically connected together or fluidically connected accordingly to the interior of the oil container which can be filled with oil.

Overall, the disadvantages outlined initially are improved in a structurally simple fashion and the efficiency of the drive train is increased.

It will be appreciated that many possibilities exist for configuring and refining the oil container according to the invention and/or the drive train according to the invention in advantageous fashion. Various features which are considered as characteristic for the invention are set forth in the appended claims.

Although the invention is illustrated and described herein as embodied in an oil container for cooling and/or lubricating bearings of a drive train of a vehicle, in particular a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The figures show an oil container 1 for cooling and/or lubricating bearings, or for supplying oil to the bearings of the drive train 2, in particular a drive train 2 of a vehicle. The vehicle, which in particular is a motor vehicle, is not illustrated in any detail.

Figure 1:
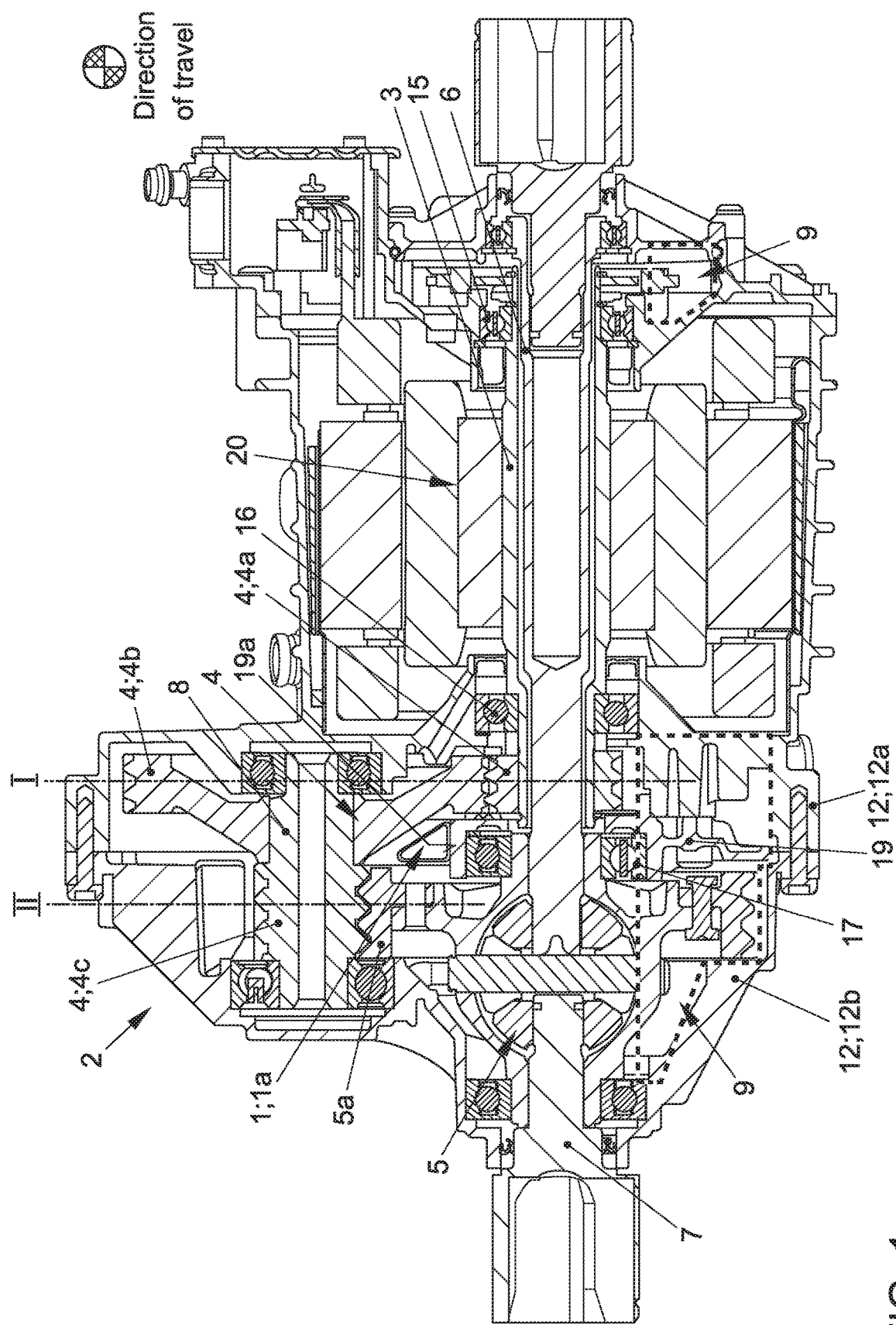
FIG. 1 is a diagrammatic view, partially in cross-section, of a drive train with the corresponding components.
Figure 2:
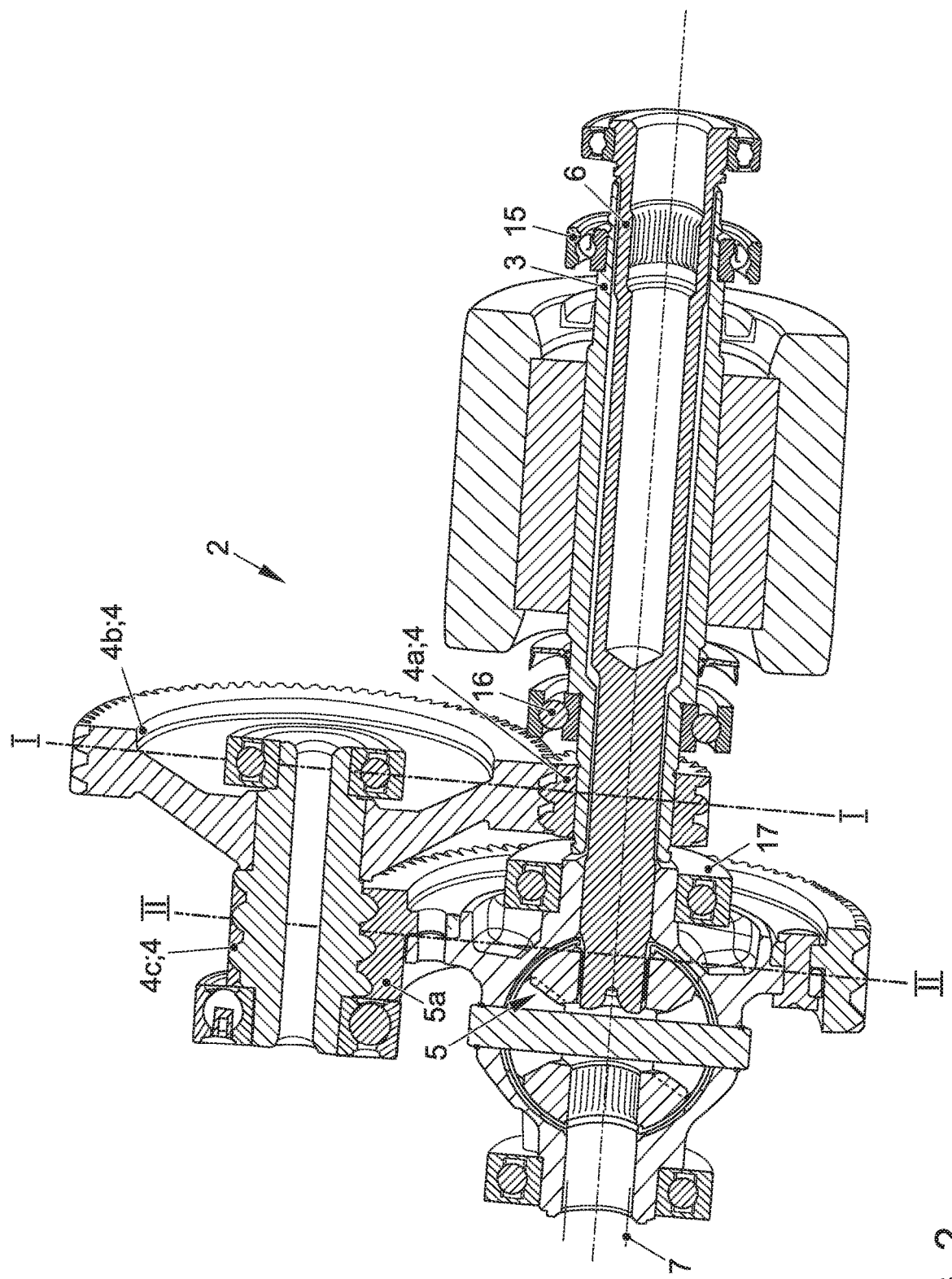
FIG. 2 is a diagrammatic view of the main components of the drive train, shown in particular without housing parts, without oil container and without end shield, but with the drive motor, driveshaft, gear stages of gear mechanism, differential and wheel driveshafts, and partly with the corresponding bearings to be supplied with oil.

Referring now to the figures of the drawing in detail and first, particularly, to FIG. 1 thereof, there is shown a drive train 2 in a diagrammatic view with the main components. FIG. 2 shows the drive train 2 of FIG. 1 with the main components but in particular without housing parts (12, 12a, 12b) and/or without housing walls or housing regions.

The drive train 2 has at least one driveshaft 3, at least one gear mechanism 4, at least one differential 5 and at least one wheel driveshaft 6, here in particular two wheel driveshafts 6 and 7.

As evident in particular from FIGS. 1 and 2 and as shown diagrammatically, the differential 5 has at least one final drive gearwheel 5a. The gear mechanism 4 is here formed in particular firstly by a gearwheel arranged on the driveshaft 3, in particular a first pinion 4a, a gearwheel 4b arranged on an intermediate shaft 8, and a second pinion 4c arranged on the intermediate shaft 8. The gear mechanism 4 has two gear stages: a first gear stage I is formed by the first pinion 4a and the gearwheel 4b which are in engagement with each other, and a second gear stage II is formed by the second pinion 4c and the final drive gearwheel 5a which are accordingly in meshing engagement with each other. Depending on viewpoint therefore, the final drive gearwheel 5a could also be functionally "counted" as part of the gear mechanism 4, in particular in order to form a functional gear mechanism 4.

As FIG. 1 shows, an oil sump 9, or oil sump region 9, is configured or provided in the lower region of the drive train, in particular in the lower region of the housing 12. The final drive gearwheel 5a splashes at least partially in the oil sump region 9, which is also clearly evident from FIG. 1.

At least one wheel driveshaft, here two wheel driveshafts 6 and 7 are arranged coaxially to the driveshaft 3. The drive train 2 is here formed as a coaxial drive train 2, in particular the wheel driveshaft 6 runs at least partially inside the driveshaft 3 formed as a hollow shaft, which is clearly evident from FIGS. 1 and 2.

Figure 9:
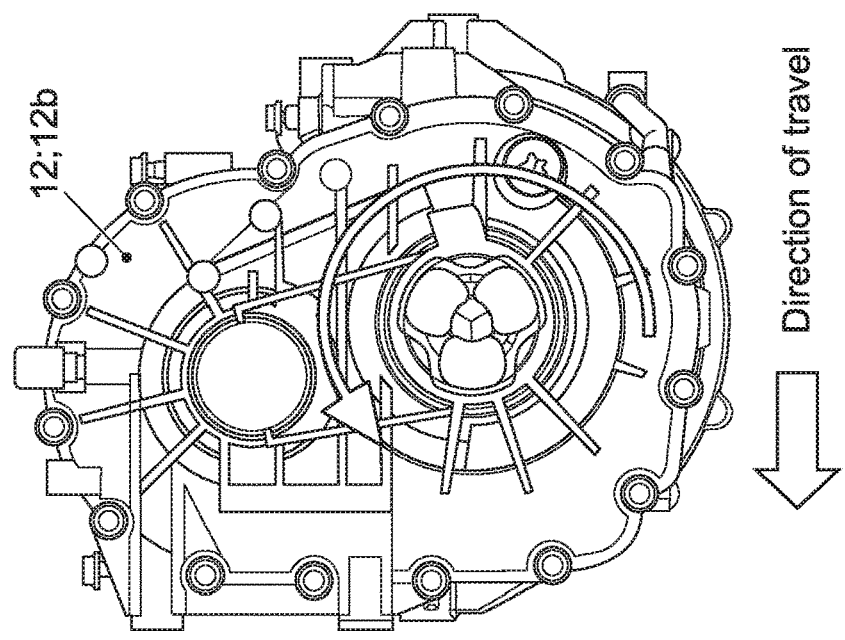
FIGS. 8 and 9 are side and front elevation views of the housing or corresponding housing parts surrounding the drive motor and differential.
Figure 8:
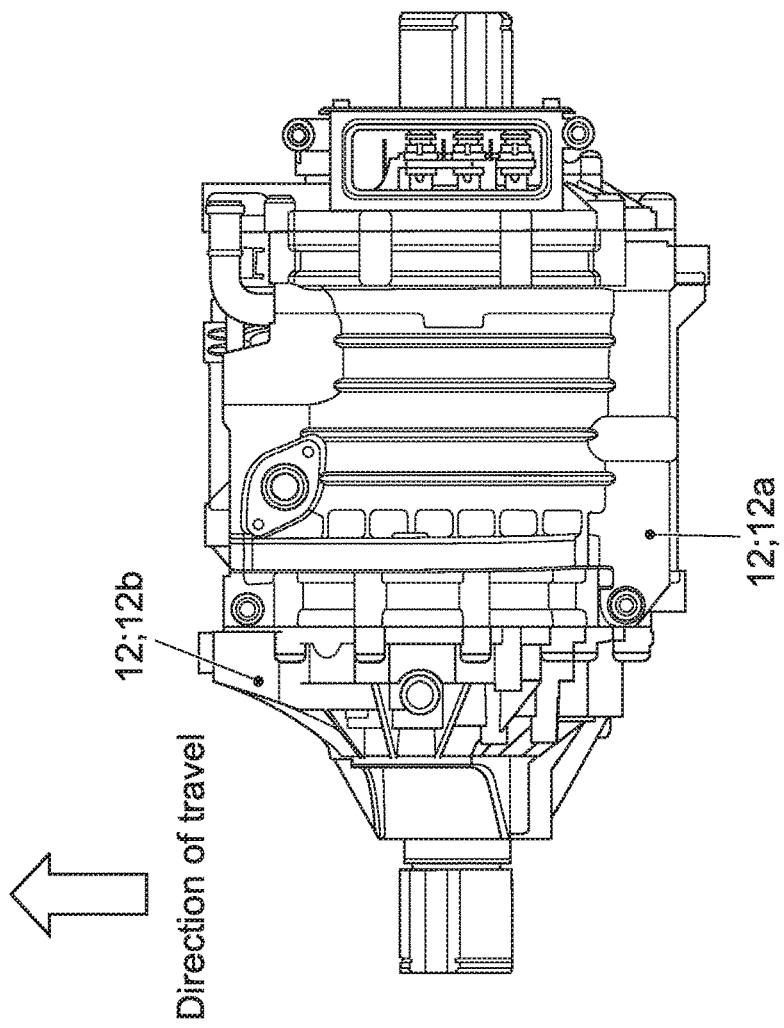
Figure 11:
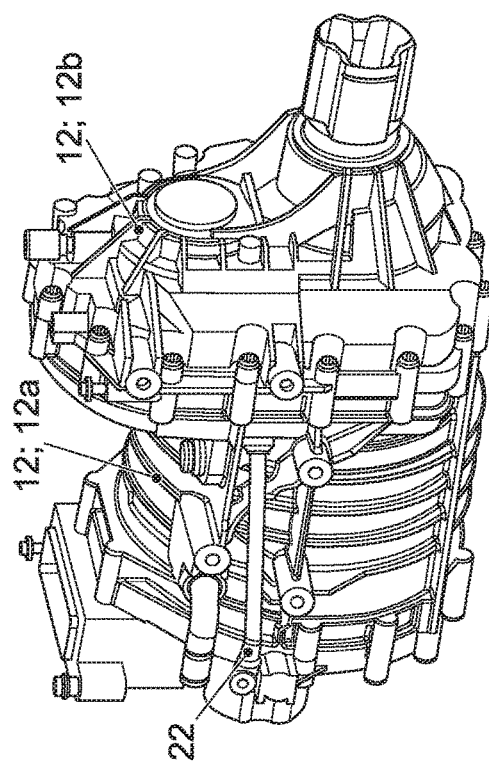
FIGS. 10 and 11 are perspective views of the housing and corresponding housing parts.
Figure 10:
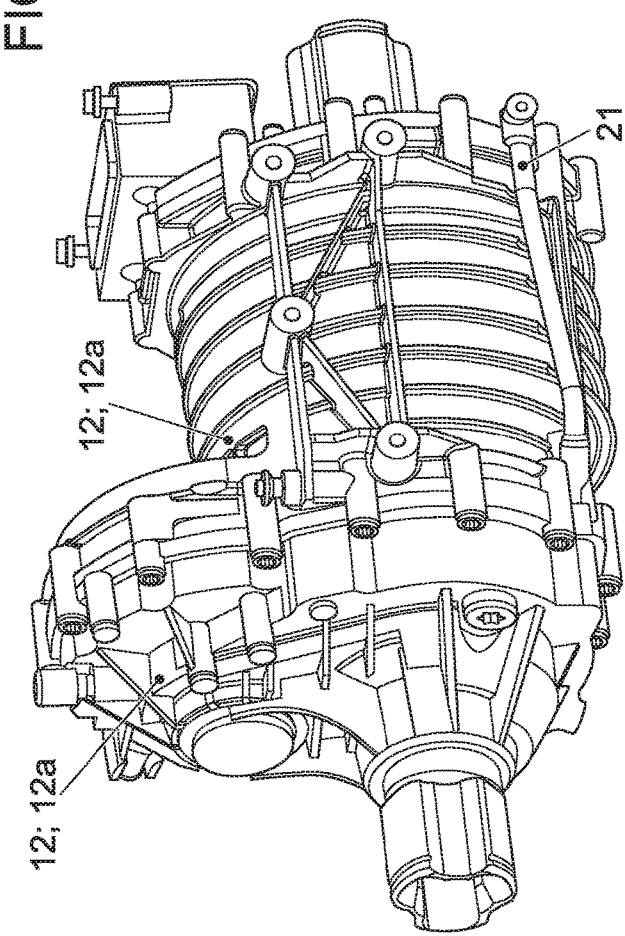

The intermediate shaft 8 of the gear mechanism 4 is now arranged substantially on the side of the driveshaft 3 opposite the oil sump region 9, and/or on the side of the wheel driveshaft 6 opposite the oil sump region 9. This is also clearly evident in FIG. 1. In other words, as is also clearly evident from FIG. 1 in conjunction with FIG. 3 and FIGS. 8 and 9, the oil sump region 9 is configured and/or present in the lower region of the housing 12, wherein the intermediate shaft 8 is mounted in the upper region of the housing 12. The expression "arranged substantially on the opposite side" therefore fundamentally means that the intermediate shaft 8 of the gear mechanism 4 is in particular arranged on a higher plane than the level of the oil sump 9, i.e. in particular mounted above the oil sump 9, in particular namely therefore "on the side of the driveshaft 3 opposite the oil sump 9". The intermediate shaft 8, viewed relative to the vertical axis of the motor vehicle, may therefore be arranged directly vertically above the driveshaft 3, but also offset partly obliquely upward and running parallel to the driveshaft 3 in the upper region of the housing 12. The housing 12 is here in particular formed from the two housing parts 12a and 12b.

The disadvantages mentioned above are now firstly avoided in that the oil container 1 is configured and/or arranged functionally such that the oil container 1 is arranged in the region between the two gear stages I and II and substantially on the side of the driveshaft 3 and/or the wheel driveshaft 6 opposite the oil sump region 9. As a result, many advantages may be achieved which have already been explained in detail above.

Figure 3:
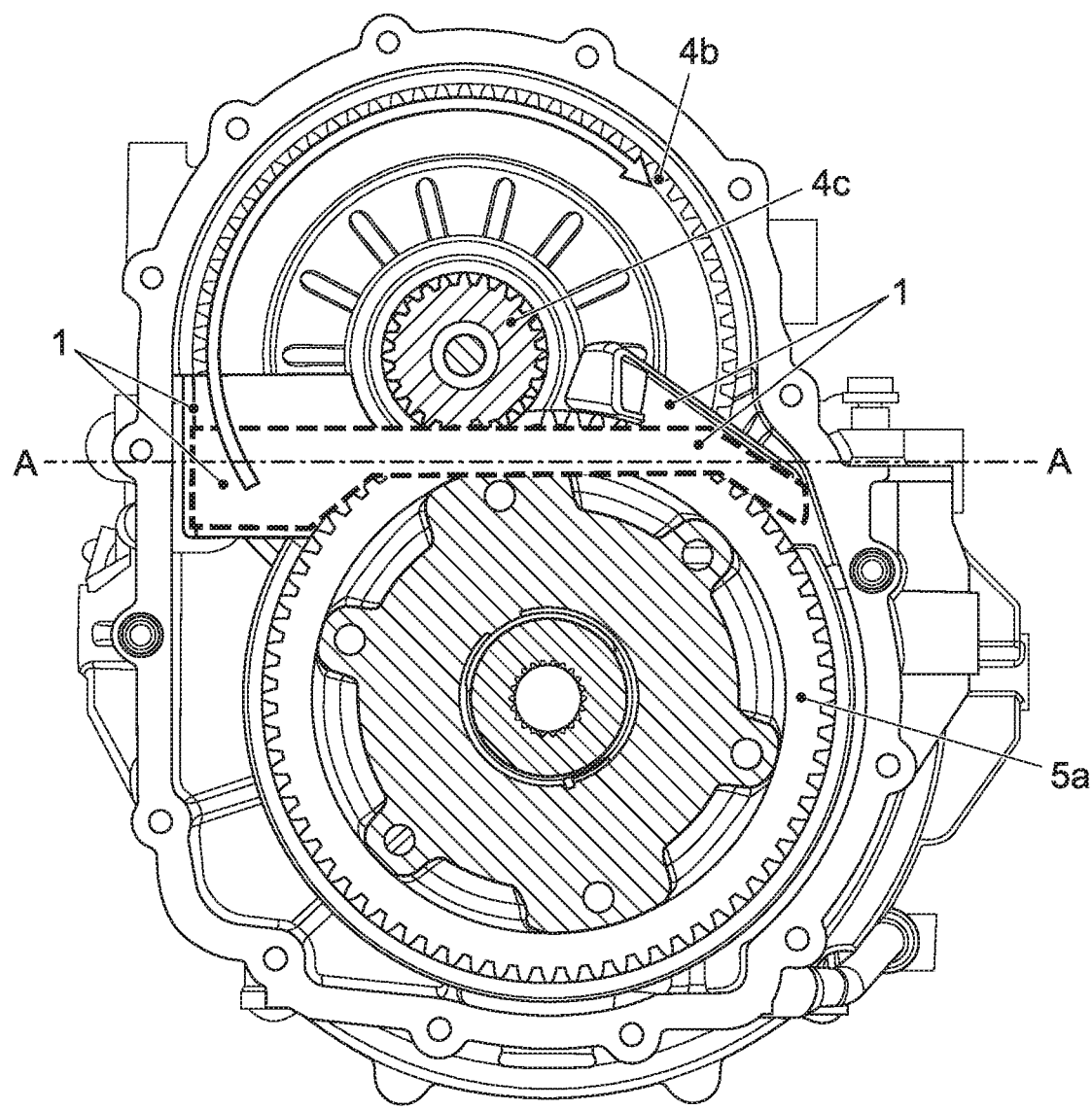
FIG. 3 is a diagrammatic view, partially in cross-section, of the arrangement of an oil container between the gear stages of the gear mechanism.
Figure 4:
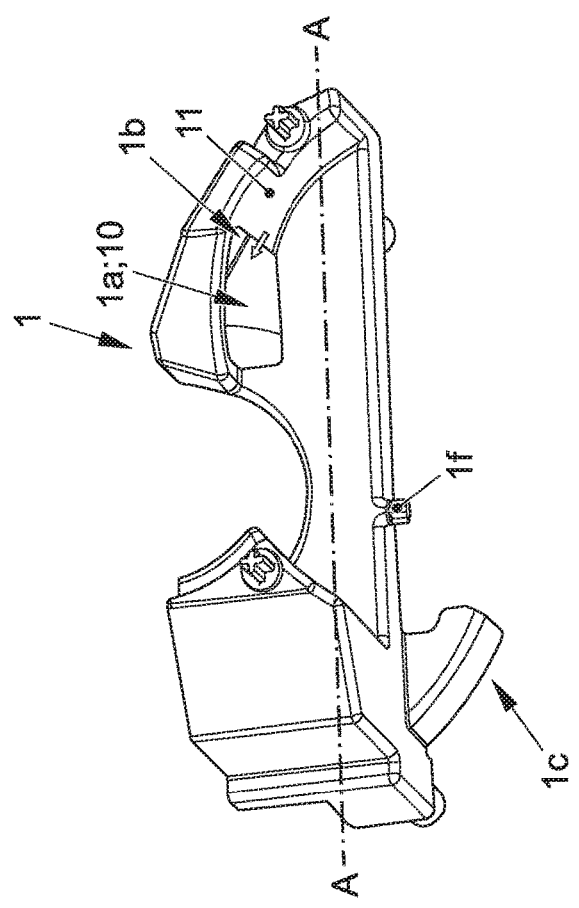
FIGS. 4 to 7 show the oil container, diagrammatically and from different sides or views, and also partially in perspective.
Figure 6:
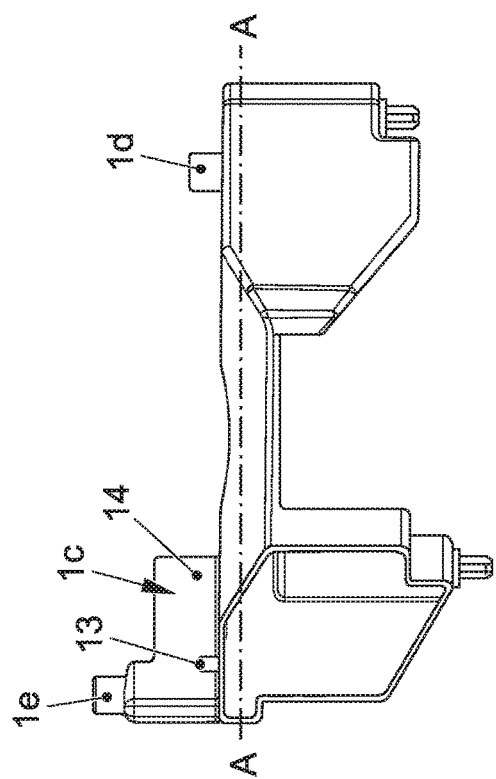

As illustrated by FIG. 3 in particular, the longitudinal axis A of the oil container 1 runs substantially parallel to the planes formed by the respective diameters, in particular by the circle diameters of the gearwheels 4a, 4b, 4c and 5a. In other words, the first gear stage I or the diameter of the gearwheels of the first pinion 4a and gearwheel 4b substantially forms a first plane of the first gear stage I, wherein the diameter of the gearwheel 4c, i.e. the second pinion 4c and the final drive gearwheel 5a, i.e. the respective diameter, forms a further plane, namely the plane of the second gear stage II. The longitudinal axis A of the oil container 1, as shown in FIG. 3 or drawn partially in FIGS. 4 to 7, extends substantially between these, wherein the longitudinal axis A then runs parallel to the above-mentioned planes.

In particular, as evident from FIG. 3, the oil container 1 then extends substantially transversely from a first housing wall of the housing 12, in particular substantially completely over the width or cross-section of the housing 12, to the other, opposite housing wall (not designated) of the housing 12. The oil container 1 is thus adapted and/or dimensioned in particular accordingly, also depending on the clearance available or the free cross-section of the housing 12.

The oil container 1 has at least one oil inlet region 1b, wherein the oil inlet region 1b is positioned and/or configured such that the rotating final drive gearwheel 5a can transport oil from the oil sump region 9 into the oil inlet region 1b. In particular, the oil inlet region 1b has an oil inlet window 10 and a curved oil catchment region 11. The latter is particularly clearly visible in FIG. 4.

Figure 5:
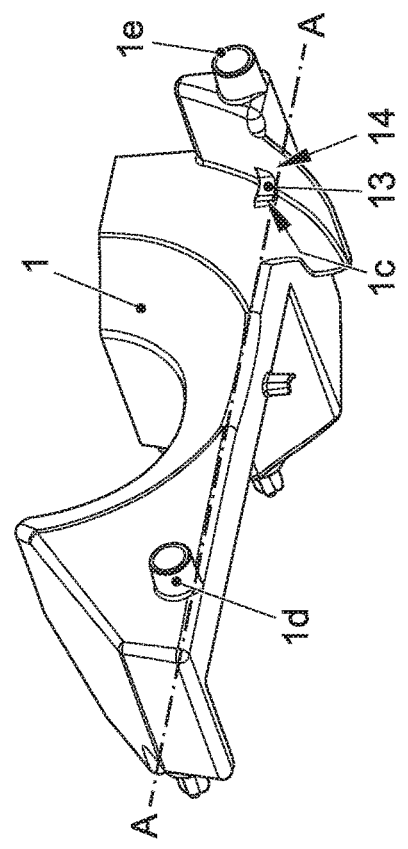
Figure 7:
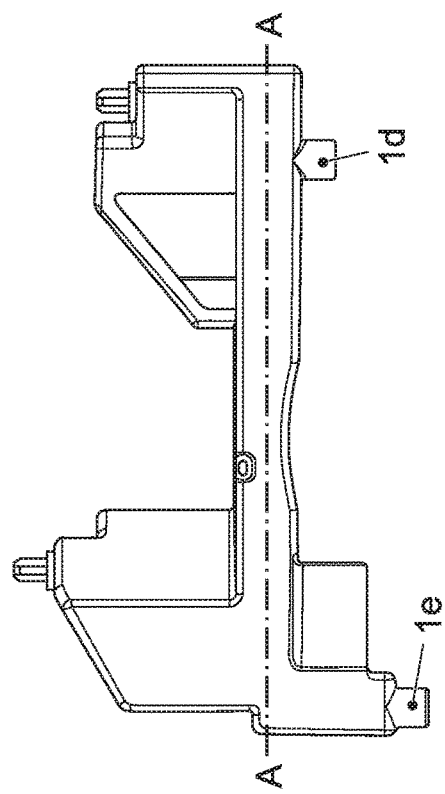

The oil container 1 furthermore has at least one first oil outlet region 1c, wherein the first oil outlet region 1c is positioned and/or configured such that firstly, oil can be extracted from the interior 1a of the oil container 1 and supplied for onward transport to a gearwheel 4b arranged on the intermediate shaft 8. FIG. 5 shows that the first oil outlet region 1c has an oil outlet window 13 and an oil guidance region 14 which is partially curved and/or configured as a ramp. In particular, the oil guidance region 14 or its curvature is adapted accordingly to the outer dimensions of the gearwheel 4b.

Figure 12A:
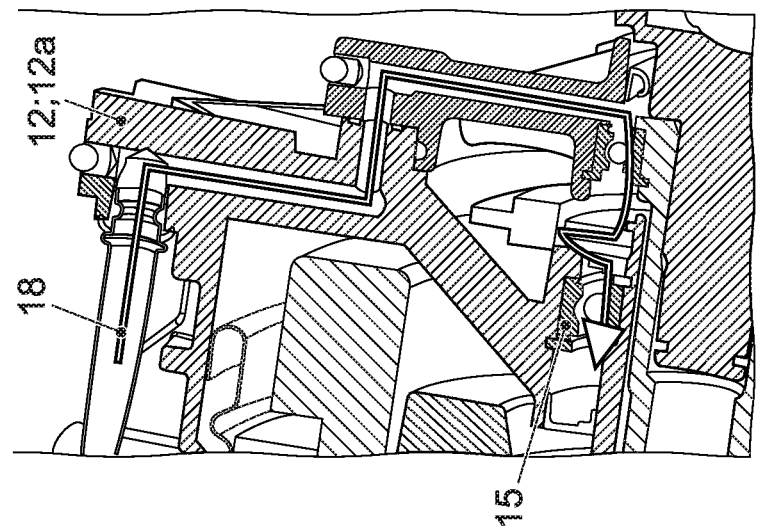
FIGS. 12A, 12B are partial excerpts with the oil container arranged in the housing or with the flow channels for supplying oil to certain bearings.
Figure 12B:
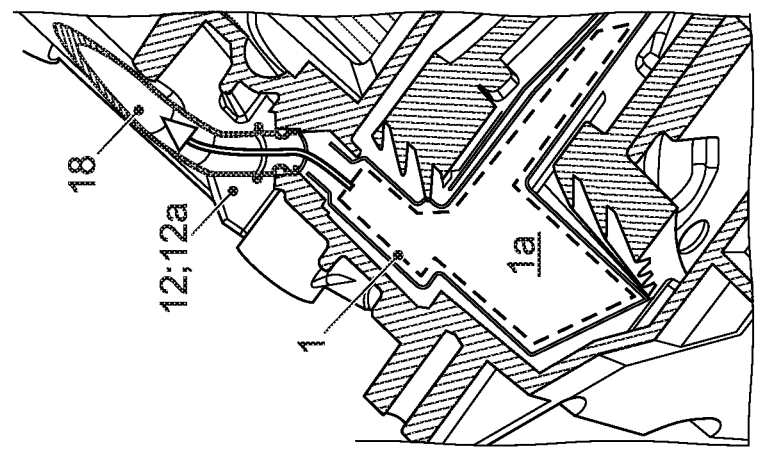

In particular, the oil container 1 has several oil outlet regions 1c, 1d, 1e and 1f, by means of which different bearings 15, 16, 17 of the drive train 2, and/or in particular several flow channels 18 leading to different bearings 15, 16, can be supplied with oil (see also FIGS. 12A and 12B).

The driveshaft 3 of the drive train 2 is mounted by means of a first and a second bearing 15 and 16 which are spaced apart from each other, as is clearly evident from FIG. 1 and in particular also from FIG. 2.

To supply these bearings 15 and 16, the oil container 1 has a second oil outlet region 1d and a third oil outlet region 1e. These two oil outlet regions 1d and 1e are particularly clearly shown in FIG. 5, in particular these are formed on the "motor side of the oil container 1."

An end shield 19, also referred to an end plate 19, for mounting the differential 5 is arranged between the differential 5 or final drive gearwheel 5a of the differential 5 and a housing 12 or housing part 12a receiving a drive motor 20, wherein the end shield 19 has a flattened region 19a on which the oil container 1 is arranged.

Finally, the oil container 1 has a fourth oil outlet region 1f, by means of which a third bearing 17 arranged in a bearing receptacle of the end shield 19 can be supplied with oil; in particular, the fourth oil outlet region 1f has an oil outlet opening (not designated individually) which is fluidically connected to a supply region of the end shield 19 that is in particular formed partially as a ramp, or the ramp-like supply region can be supplied with oil via the fourth oil outlet region 1f. Here, the ramp-like supply region of the end shield 19 is formed in particular as an integral part of the end shield 19.

As FIGS. 12A and 12B show, the housing 12 or in particular the corresponding housing part 12a has flow channels 18 for supplying the bearings 15. As clearly shown in particular in FIGS. 4 to 7, the first, second and third oil outlet regions 1c, 1d and 1e are arranged and/or formed on the same side of the oil container 1, in particular on the motor side of the oil container 1, wherein the oil inlet region 1b is arranged and/or formed on the opposite side of the oil container 1. Finally, the fourth oil outlet region 1f is arranged on the underside of the oil container 1.

By the arrangement and/or formation of the oil container 1 shown here in the drive train 2 shown and presented here, the advantages outlined initially can be achieved. In particular, oil can now be conveyed from the oil sump 9 via the final drive gearwheel 5a into the oil inlet region 1b of the oil container 1 or into the interior 1a of the oil container 1. In particular, the formation of the end shield 19 and its also partially dimensional adaptation to the dimensions of the final drive gearwheel 5a promote the inlet of oil into the oil inlet region 1b, in particular into the oil inlet window 10 of the oil container 1. The oil then collects accordingly in the interior of the oil container 1. Via the oil outlet regions, in particular via the first oil outlet region 1c and here via the oil outlet window 13 and the oil guidance region 14, oil is then supplied for onward transport to the gearwheel 4b assigned to the intermediate shaft 8, where it lubricates and oils the gearwheel 4b and corresponding further components.

Via further oil outlet openings, in particular via a second and third oil outlet opening 1d and 1e, wherein these oil outlet openings are formed similarly to a push-fit connection, the corresponding oil now passes via flow channels 18 (which are here shown only partially in particular in FIGS. 12A and 12B) to the bearings 15 or 16 mounting the driveshaft 3. Finally, the oil container 1 is configured such that a bearing 17 arranged in the bearing receptacle of the end shield 19 can also be lubricated and/or cooled accordingly via a fourth oil outlet opening 1f.

Finally, FIGS. 8 to 11 show the housing 12 with the housing part 12a which substantially encases or surrounds the drive motor 20, and the housing part 12b which substantially surrounds the differential 5, the final drive gearwheel 5a or parts of the gear mechanism 4. Furthermore, the arrangement and/or orientation/positioning in height of some components in relation to the direction of travel of the motor vehicle are also clearly evident. Furthermore, corresponding pipelines or channels 21, 22 for at least partial return of the oil to the oil sump region 9, or for conduction of the oil outside the housing 12, in particular between two flow channels, are also shown.

It should also be pointed out here that the oil sump region 9 is in particular divided by means of the end shield 19 into two regions, wherein the end shield 19 here has a flange-like peripheral region (not designated in detail) which extends in the downward direction to the oil sump region 9. This configuration in particular prevents unnecessary splash losses when the final drive gearwheel 5a is arranged splashing in the oil sump region 9, as shown here.

In particular, it should be pointed out here, as also evident from FIGS. 1 and 3, that the end shield 19 is configured such that it is arranged and/or formed physically closely adjacent to the final drive gearwheel 5a, such that the oil stream can be supplied to the oil container 1 or the oil inlet region 1b via the final drive gearwheel also by means of the end shield 19.

In sum, the disadvantages mentioned in the introduction are avoided and corresponding advantages are achieved.

The following is a list of reference numerals used in the above description of the invention with reference to the drawing figures:

1 Oil container
1a Interior
1b Oil inlet region
1c First oil outlet region
1d Second oil outlet region
1e Third oil outlet region
1f Fourth oil outlet region
2 Drive train
3 Driveshaft
4 Gear mechanism
4a First pinion
4b Gearwheel
4c Second pinion
5 Differential
5a Final drive gearwheel
6 Wheel driveshaft
7 Wheel driveshaft
8 Intermediate shaft
9 Oil sump region
10 Oil inlet window
11 Oil catchment region
12 Housing (12a/12b housing part)
13 Oil outlet window
14 Oil guidance region
15 Bearing 16 Bearing
17 Bearing
18 Flow channel
19 End plate
19a Flattened region
20 Drive motor
21 Pipeline/channel
22 Pipeline/channel
A Longitudinal axis of oil container
I First gear stage
II Second gear stage

The invention claimed is:

1. An oil container for at least one of cooling or lubricating bearings of a drive train of a vehicle, the drive train having a driveshaft, a gear mechanism, a differential, and at least one wheel driveshaft, the differential having a final drive gearwheel and the final drive gearwheel meshing in engagement with at least one gearwheel of the gear mechanism;
   an oil sump region configured for at least one of the final drive gearwheel or a gearwheel of the gear mechanism to splash at least partially in the oil sump region;
   at least one of the gearwheels of the gear mechanism or the final drive gearwheel forming at least two gear stages, and two gearwheels of the gear mechanism being arranged on an intermediate shaft, and at least one wheel driveshaft being disposed coaxially to the driveshaft, and wherein the intermediate shaft of the gear mechanism is arranged substantially on a side of at least one of the driveshaft or a wheel driveshaft opposite the oil sump region; and
   the oil container being configured in a region between the two gear stages and substantially on a side of at least one of the driveshaft or wheel driveshaft lying opposite the oil sump region.

2. The oil container according to claim 1, wherein a longitudinal axis of the oil container extends substantially parallel to planes determined by respective diameters of the gearwheels.

3. The oil container according to claim 1, wherein the oil container is formed with an interior to be filled with oil and at least one oil inlet region, the oil inlet region being configured such that oil is transported from the oil sump region into the oil inlet region by a rotating final drive gearwheel.

4. The oil container according to claim 3, wherein the oil inlet region has an oil inlet window and a curved oil catchment region.

5. The oil container according to claim 1, wherein the oil container is formed with a first oil outlet region configured such that firstly oil can be extracted from the interior of the oil container and supplied for onward transport to a gearwheel disposed on the intermediate shaft.

6. The oil container according to claim 5, wherein the first oil outlet region has an oil outlet window and at least one of a partially curved or ramp-shaped oil guidance region.

7. The oil container according to claim 1, wherein the oil container is formed with a plurality of oil outlet regions configured to supply different bearings of at least one of the drive train or several flow channels leading to different bearings with oil.

8. The oil container according to claim 7, wherein the driveshaft of the drive train is mounted at axially spaced-apart first and second bearings and wherein the oil container is formed with second and third oil outlet regions for supplying said first and second bearings.

9. The oil container according to claim 8, further comprising an end shield for mounting the differential disposed between the differential or the final drive gearwheel of the differential and a housing part for receiving a drive motor, wherein the end shield has a flattened region on which the oil container is disposed.

10. The oil container according to claim 9, wherein the oil container has a fourth oil outlet region, for supplying a third bearing arranged in a bearing receptacle of the end shield with oil.

11. The oil container according to claim 10, wherein the fourth oil outlet region has an oil outlet opening which is fluidically connected to a supply region of the end shield.

12. The oil container according to claim 11, wherein the supply region is partially formed in a ramp shape.

13. The oil container according to claim 8, further comprising a housing formed with flow channels for supplying the first and second bearings, to be supplied with oil by way of the second and third oil outlet regions.

14. The oil container according to claim 8, wherein the first, second and third oil outlet regions are formed on a same side of the oil container, the oil inlet region is formed on a opposite side of the oil container, and the fourth oil outlet region is formed on an underside of the oil container.

15. A drive train device, comprising:
   a driveshaft, a gear mechanism, a differential, and at least one wheel driveshaft, said differential having a final drive gearwheel disposed to mesh in engagement with at least one gearwheel of said gear mechanism;
   an oil supply for at least one of cooling or lubricating bearings of the drive train, said oil supply including an oil sump region wherein at least one of said final drive gearwheel or a gearwheel of said gear mechanism dip at least partially in splashing fashion;
   at least one of the gearwheels of said gear mechanism or said final drive gearwheel forming two gear stages, and two gearwheels of said gear mechanism being arranged on an intermediate shaft, and at least one wheel driveshaft being disposed coaxially to said driveshaft, and wherein said intermediate shaft of said gear mechanism is arranged substantially on a side of at least one of said driveshaft or a wheel driveshaft opposite said oil sump region; and
   an oil container configured in a region between the two gear stages and substantially on a side of at least one of said driveshaft or said wheel driveshaft lying opposite said oil sump region.

* * * * *